US012479715B2

(12) United States Patent
Gunzel et al.

(10) Patent No.: US 12,479,715 B2
(45) Date of Patent: Nov. 25, 2025

(54) TRANSFER DEVICE FOR A FLUID

(71) Applicant: NEXANS, Courbevoie (FR)

(72) Inventors: Gerald Gunzel, Vechelde (DE); Ralf Egerer, Hannover (DE)

(73) Assignee: NEXANS, Courbevoie (FR)

( * ) Notice: Subject to any disclaimer, the term of this patent is extended or adjusted under 35 U.S.C. 154(b) by 6 days.

(21) Appl. No.: 18/421,127

(22) Filed: Jan. 24, 2024

(65) Prior Publication Data

US 2024/0308839 A1 Sep. 19, 2024

(30) Foreign Application Priority Data

Jan. 26, 2023 (EP) .................................... 23305099

(51) Int. Cl.
*B67D 9/02* (2010.01)

(52) U.S. Cl.
CPC .................................... *B67D 9/02* (2013.01)

(58) Field of Classification Search
CPC . B67D 7/0401; B67D 2007/0403; B67D 9/02
See application file for complete search history.

(56) References Cited

U.S. PATENT DOCUMENTS

2007/0071155 A1 3/2007 Boerstler et al.
2014/0318666 A1 10/2014 Benedetti et al.
2018/0202608 A1* 7/2018 Unno ........................ B67D 9/00
2024/0025731 A1* 1/2024 Duensing .............. B63B 21/507

FOREIGN PATENT DOCUMENTS

WO 99/35031 7/1999

OTHER PUBLICATIONS

European Search Report dated Jul. 11, 2023.

* cited by examiner

*Primary Examiner* — Paul J Gray
(74) *Attorney, Agent, or Firm* — MUNCY, GEISSLER, OLDS & LOWE, P.C.

(57) ABSTRACT

A transfer device for transferring flowable material between a first reservoir and a second reservoir is provided having a loading device (106) mounted on a support structure (101). The loading device (106) includes several loading arm sections (103-105) mechanically connected by pivot joints (113,116,118). The transfer device further has a transfer line (122) connecting the first and second reservoir. The transfer line (122) is composed of rigid and flexible transfer line sections (123-126, 133). The flexible transfer line sections connect the rigid transfer line sections. At an upstream end at least one rigid transfer line section branches into several flexible transfer lines, which are fluidly merged into the next rigid transfer line in flow direction.

15 Claims, 4 Drawing Sheets

TRANSFER DEVICE FOR A FLUID

RELATED APPLICATION

This application claims the benefit of priority from European Patent Application No. 23305099.6, filed on Jan. 26, 2023, the entirety of which is incorporated by reference.

FIELD

The present disclosure relates to a transfer device for fluids between a vehicle such as a tanker and a mooring area.

BACKGROUND

Global efforts for reducing carbon dioxide emissions spurred the interest in alternative energy sources such as liquefied natural gas (LNG) and liquefied hydrogen (LH2) because these energy sources may contribute to a decrease of carbon dioxide emissions and to slow down or even stop the global climate change. In the following the mentioned alternative energy sources are denominated generally as cryogenic fluids. The cryogenic fluids are typically transported in liquefied form with tankers between harbors. To this end, it is necessary to connect tanks of a tanker with a transfer line with the reservoir in a harbor where the tankers are loaded or unloaded. Since ships have different sizes and heights and also are not completely immobile in a harbor, the connecting transfer lines must allow for connecting the transfer line at different distances and vertical levels to be connectable with a coupling on the ship and to compensate the movement of the ship. For these reasons the transfer line must be flexible.

US 2020/0071155 A1 discloses a device for transferring a cryogenic fluid between the ship and a mooring area in the harbor. The known device comprises long flexible lines to enable connecting ships of different height and sizes with the reservoir in the mooring area. However, long flexible lines are exposed to significant wind loads depending on the weather situation. High wind loads on flexible lines can be dangerous for the transfer line if the loads exceed acceptable levels and cause mechanical damages to the flexible lines or their corresponding couplings.

The need of flexible transfer lines and their inherent problems apply to any transfer device for flowable materials that can have a solid, liquid or gaseous state of aggregation. In the following any kind of flowable material irrespective of its state of aggregation will be referred to as fluid including solid powders that can be pumped and flow through transfer lines like a liquid. Fluids in this sense also include aerosols and emulsions.

In view of the limitations of existing transfer devices, there remains a desire for a transfer device to overcome or at least improve one or more of the problems mentioned at the outset.

SUMMARY

According to a first aspect the present disclosure suggests a transfer device for transferring flowable material between a first reservoir and a second reservoir. The flowable material can be a fluid in the sense as explained in the background section. The transfer device comprises a loading device including several mechanically connected loading arm sections. The transfer device further comprises at least one transfer line connecting the first and second reservoir. The transfer line is composed of rigid and flexible transfer line sections. Each rigid transfer line section extends along at least one loading arm section. The flexible transfer line sections connect the rigid transfer line sections. At an upstream end at least one rigid transfer line section branches into several flexible transfer lines, which are fluidly merged into the next rigid transfer line in flow direction.

The transfer device according to the present disclosure allows for a high mechanical flexibility because the multiple flexible transfer lines have a smaller diameter than it would be needed for a single flexible transfer line and smaller bending radii can be realized. This is particularly important when the transfer device is folded to occupy only a small area on a mooring area. In addition to that, flexible transfer lines with a smaller diameter enable higher working pressures.

In one embodiment the rigid transfer line sections form the loading arm sections. In this embodiment the rigid transfer lines are stable components that do not require any additional supporting structure such as a strut like loading arm section.

In a preferred embodiment of the transfer device the several loading arm sections are mechanically connected by at least one pivot joint. Pivot joint with a sufficiently large pivot angle permits to fold the transfer device onto a small area especially when the transfer device is idle.

In an advantageous embodiment the rigid and flexible transfer line sections are vacuum insulated transfer lines. Vacuum insulated transfer lines are particularly advantageous when the transfer device is arranged for transferring cryogenic fluids between the first and second reservoir because insulated transfer lines effectively limit the evaporation of the transferred cryogenic fluid. In this embodiment it is very useful to branch the rigid transfer line section into several flexible transfer lines, which are fluidly merged into the next rigid transfer line in flow direction. For instance, for effective transfer of LNG single lines with an inner diameter of 400 to 500 mm are needed. In contrast to that, vacuum insulated flexible lines are mostly available with an inner diameter of 200 mm and an outer diameter of 300 mm. Also from this perspective is it is advantageous to branch off the single rigid transfer line into several flexible transfer lines.

In an advantageous embodiment the flexible transfer line sections connect rigid transfer line sections across the pivot joint connecting the transfer arm sections associated with the rigid transfer line sections.

Preferably, each rigid transfer line section is fluidly connected with a distributor-collector-component that branches the rigid transfer line into the several flexible transfer line sections and/or merges the several flexible transfer line sections.

It depends on the flow direction of the fluid through the transfer line whether the distributor and/or collector components is effective as distributor or connector. The distributor-collector-component can take different forms such as a T-, E-, X-etc. component depending on the specific application of the transfer device.

In a preferred embodiment the flexible transfer line sections form a loop.

The loop permits to bridge the transfer line across the pivot joint having the largest pivot angle without undershooting the smallest allowed bending radius of the flexible transfer line.

In an alternative embodiment of the transfer device two adjacent rigid transfer line sections associated with two adjacent loading arm sections are angled such that an angled portion of the two transfer line sections deviates from being parallelly oriented with the associated loading arm sections.

In this alternative embodiment the flexible transfer line sections fluidly connecting the angled portions of the two adjacent rigid transfer line sections preferably take an S-shaped form when the loading arm sections associated with the two rigid transfer line sections approach a 180° configuration.

Advantageously, the radii of curves of the S-shaped flexible transfer lines are bigger than a minimal allowed bending radius of the flexible transfer lines.

It has been found useful to arrange a connection component next to the pivot joint connecting the associated loading arm sections, wherein the connection component is horizontally oriented.

Preferably, the axis of the pivot joint passes through the connection component.

In an advantageous embodiment upstream and downstream flexible transfer lines are connected with the connection component.

For practical reasons it is useful when a vertical portion of a support structure is pivotable in a base bearing. The base bearing allows for orienting the transfer device towards the ship to be loaded or unloaded.

In a preferred embodiment one rigid transfer line section extends along a vertical portion of the support structure and provides a fluid input. The fluid input can be connected with a flexible line with the first reservoir. The fluid input can be an input coupling, such as a Johnston Coupling.

BRIEF DESCRIPTION OF THE DRAWINGS

Exemplary embodiments of the present disclosure are illustrated in the drawings and are explained in more detail in the following description. In the figures, the same or similar elements are referenced with the same or similar reference signs. It shows.

DETAILED DESCRIPTION

A transfer device according to the present disclosure is normally situated on the mooring quay on land or on a bunker ship, which supplies other ships with cargo or fuel. The term mooring area is used below to represent these possibilities. For the sake of brevity, in the following description of embodiments reference is made to cryogenic fluids only. However, it is to be understood that instead of cryogenic fluids any kind of fluid can be transferred by the transfer device. As mentioned above, the term fluid is to be understood in the sense that it includes any kind of flowable material irrespective of its state of aggregation. Thus, the term fluid encompasses gas, liquid and solid powder or granular material that can flow through transfer lines like a liquid.

Figure 1:
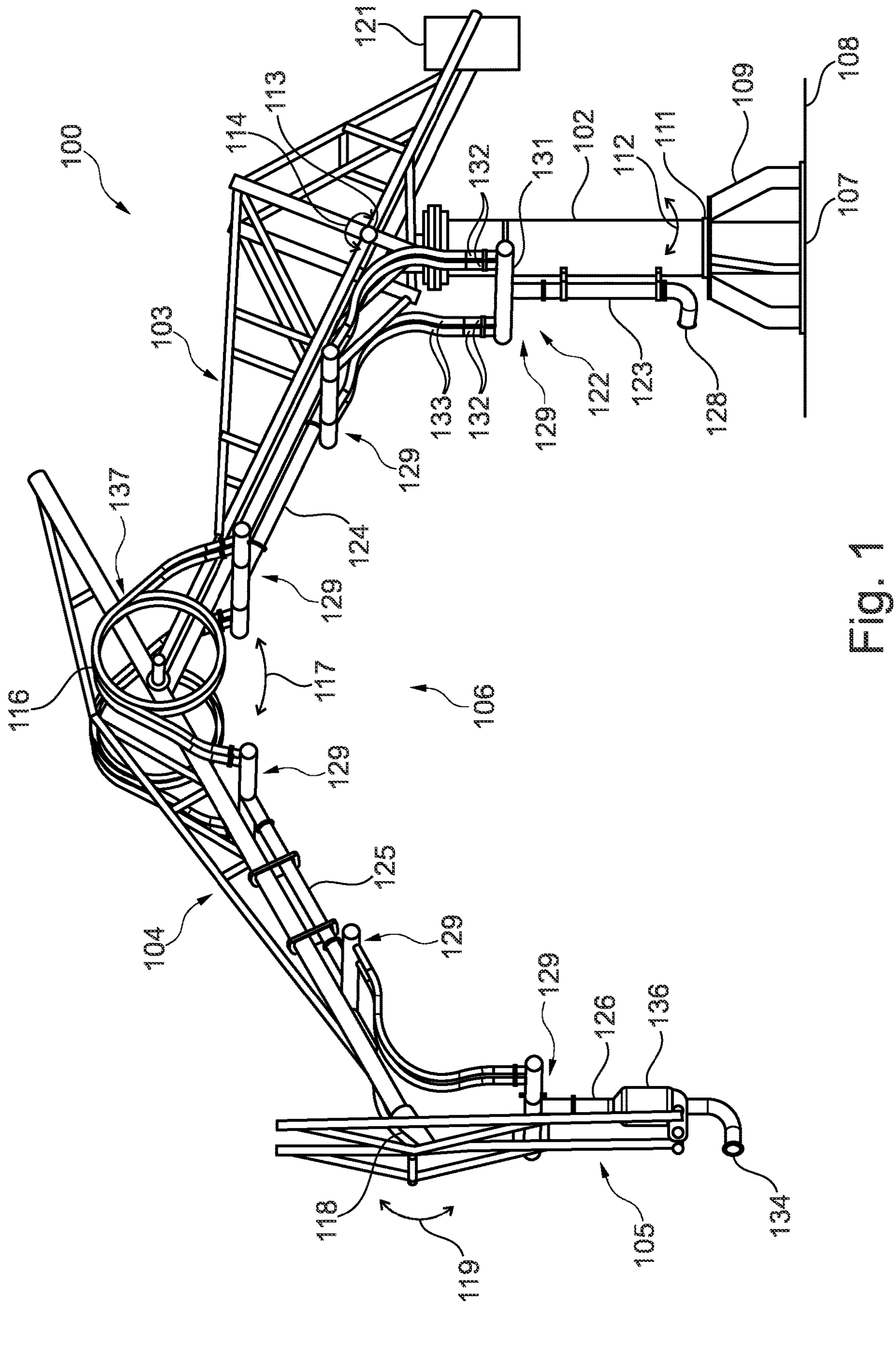
FIG. 1 a first embodiment of a transfer device according to the present disclosure.

FIG. 1 shows an illustrative example of the transfer device 100 of the present disclosure. The transfer device 100 comprises a support structure 101 including a vertical portion, namely a vertical pillar 102, and a first, second, and third loading arm section 103-105. The loading arm sections 103-105 are strut like structures known in conventional steel construction. The entirety of the loading arm sections 103-105 is also referred to as loading device 106.

The pillar 102 has a base plate 107, which is firmly connected with the ground 108 of the mooring area. Reinforcement ribs 109 connect the base plate with the pillar 102 to ensure a stable stand of the pillar 102 on the mooring area. A base bearing 111 enables rotatable movement of the pillar 102 relative to the ground 108 of the mooring area as it is indicated by double headed arrow 112.

The first loading arm section 103 is a hinged on the pillar 102 by a first pivot joint 113. The pivotal movement of the first loading arm section 103 relative to the pillar 102 is indicated by double headed arrow 114. A distal end of the first loading arm section 103 is provided with a second pivot joint 116, which connects the first loading arm section 103 with the second loading arm section 104. The second pivot joint 116 permits a pivotable movement of the second loading arm section 104 relative to the first loading arm section 103 as it is indicated with double headed arrow 117. A distal end of the second loading arm section 104 has a third pivotable joint 118 pivotably connecting the second loading arm 104 with the third loading arm 105 section. The allowed movement of the third loading arm section 105 is symbolized by double headed arrow 119. The first loading arm 103 carries at the end opposite to the second pivot joint 116 a counterweight 121 for counter weighting at least partially the weight of the loading device 106 to reduce the leverage forces on the pillar 102.

The support structure 101 carries a transfer line 122 which extends from a lower end of the pivotable pillar 102 to the distal end of the loading device 106. The transfer line is a vacuum insulated line attached to the loading device 106. The transfer line 122 comprises rigid transfer line sections 123-126, which are attached to the first, second, and third loading arm section 103-105, respectively. A loading arm section is also referred to as associated loading arm section with regard to the rigid transfer line section attached to it. The rigid transfer line sections 123-126 are single lines. Whenever a rigid line is acceptable it is preferred over a flexible transfer line because a rigid line can withstand higher pressures because a wall thickness of a rigid transfer line can be adapted to a desired working pressure. A single transfer line is advantageous over multiple transfer lines because it is less heavy than multiple lines for realizing the same throughput. In other embodiments the transfer lines are not vacuum insulated but are enclosed in insulating material or are not insulated at all. It depends on the kind of application of the transfer device whether the transfer lines are insulated and what kind of insulation is selected.

The rigid transfer line section 123 extending along the vertical pillar 102 has on one end an input coupling or entry flange 128, which is connected with a flexible supply line (not shown) supplying cryogenic fluid from a reservoir on land. The flexible supply line permits pivotable movement of the pillar 102 without requiring a rotatable seal or the like in the supply line or the rigid line section 123. Normally, rotatable seals are not completely leak tight, in particular not when the cryogenic fluid is LH2. Hence, avoiding rotatable seals is advantageous regarding protection of the environment and against hazards.

The other end of the rigid transfer line 123 is connected with a distributor-collector-component 129 including a transversal tube 131 equipped with pipe sockets 132. Each pipe socket 132 is connected with a flexible line 133. The diameter of the flexible lines 133 is smaller than the diameter of the rigid transfer line 123 but the free passage area of the four flexible lines 123 is at least as big as the free passage area of the rigid transfer line 123. Therefore, the throughput of the flexible lines 133 corresponds to the throughput of rigid transfer line section 123 at the same working pressure. The rigid transfer line sections 124 and 125 are provided with similar distributor-collector-components 129 at both ends. In contrast to that, the rigid transfer line 126 is provided only at one of its ends with the distributor-collector-component 129 while its other end the rigid transfer line 126 has an output coupling or flange 134. The output coupling 134 is either directly connected with a coupling of the tank on the ship or with a single flexible line connecting the transfer line 122 with a tank on the ship. The rigid transfer line 126 is equipped furthermore with an emergency release coupling 136 which immediately shuts off the flow of fluid if e.g. the load at the emergency release coupling 136 increases to much. Such load increase could indicate an unintended movement of the ship which is loaded or unloaded with fluid.

The flexible lines 133 permit pivotable movements of the loading arms 123-126 around the pivot joints 113, 116, and 118 in order to adapt the horizontal and vertical position of the output coupling 134. The adaptation of the horizontal and vertical position of the output coupling 134 is important to make the compatible with different ship sizes. The roles of the input and output coupling 128, 134 can be interchanged when a tank of a tanker is connected to output coupling 134 for unloading a tanker.

The rigid transfer line sections 123-126 and the flexible line sections 133 are vacuum insulated lines minimizing heat transfer to the cryogenic fluid. Compared to a single flexible line that connects the rigid transfer line sections 123-126 multiple flexible lines can have a smaller diameter. This brings about the advantage that thinner flexible lines can withstand a higher working pressure than a single flexible line because the wall thickness of the vacuum insulated flexible lines cannot be increased. Furthermore, multiple thin flexible lines permit smaller bending diameters than a single flexible line having the same free passage area than the multiple thin flexible lines together. For that reason, thin flexible lines enable larger swivel angles of the loading arm sections 103-105, which is important when the transfer device 100 is to be folded on a small area. This property relaxes space requirements that can be an important advantage for certain installation sites.

The flexible lines 133 connecting the first and the second loading arm 103, 104 exhibit a loop 137. The diameter of the loop 137 becomes smaller when the second loading arm 104 moves towards a 180° position relative to the first loading arm 103. Conversely, when the first and second loading arms 103, 104 are folded together, the diameter of the loop 137 increases. The loop 137 enables a larger swiveling movement of the second loading arm 104 around the pivot joint 116 than a direct connection without any loop. This is especially advantageous when the transfer device is folded to a small area when it is idle.

Figure 2A:
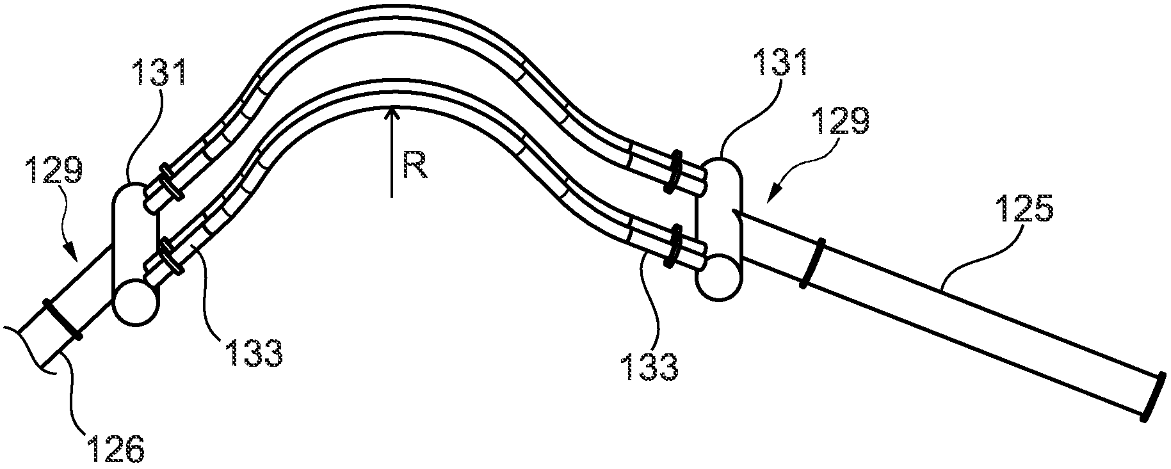
FIGS. 2A, 2B detailed views of flexible transfer lines of the transfer device shown in FIG. 1.
Figure 2B:
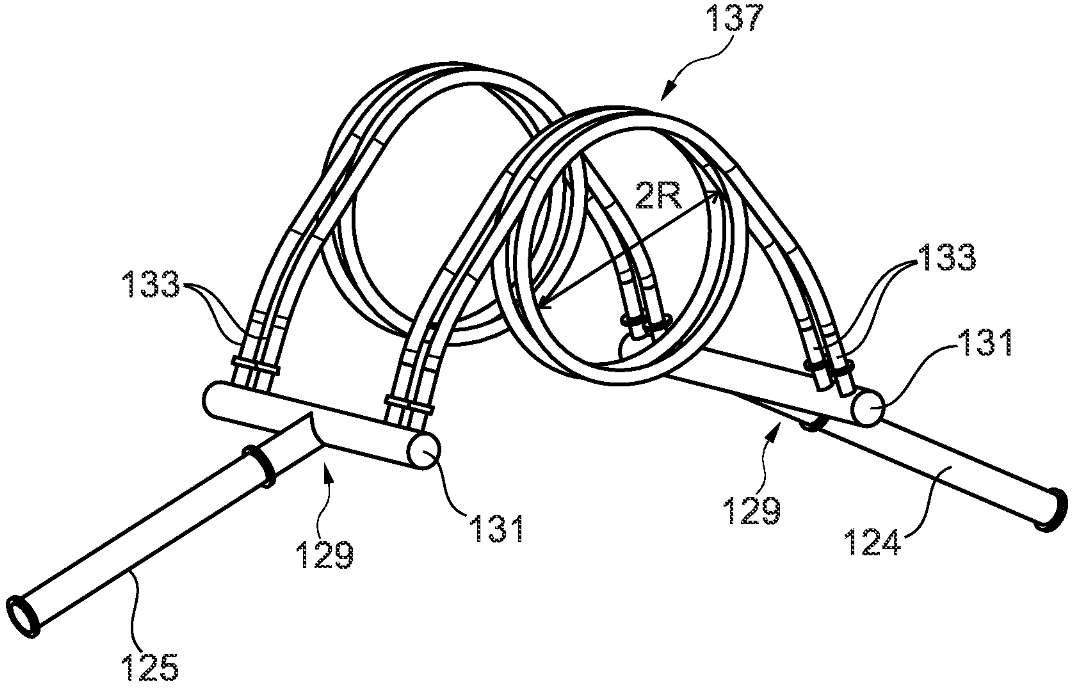

FIG. 2A exhibits the transition between the rigid transfer lines 125 and 126 in greater detail. Likewise FIG. 2B shows the transition area between the rigid transfer lines 124 and 125 in more detail. The bending radii in FIGS. 2A and 2B are indicated as R. In all embodiments of the transfer device according to the present disclosure the bending the radii remain above the minimal bending radios of the employed flexible transfer lines 133. For the sake of clarity, the strut like structure of the loading arms 104-105 has been omitted in FIGS. 2A and 2B.

Figure 3A:
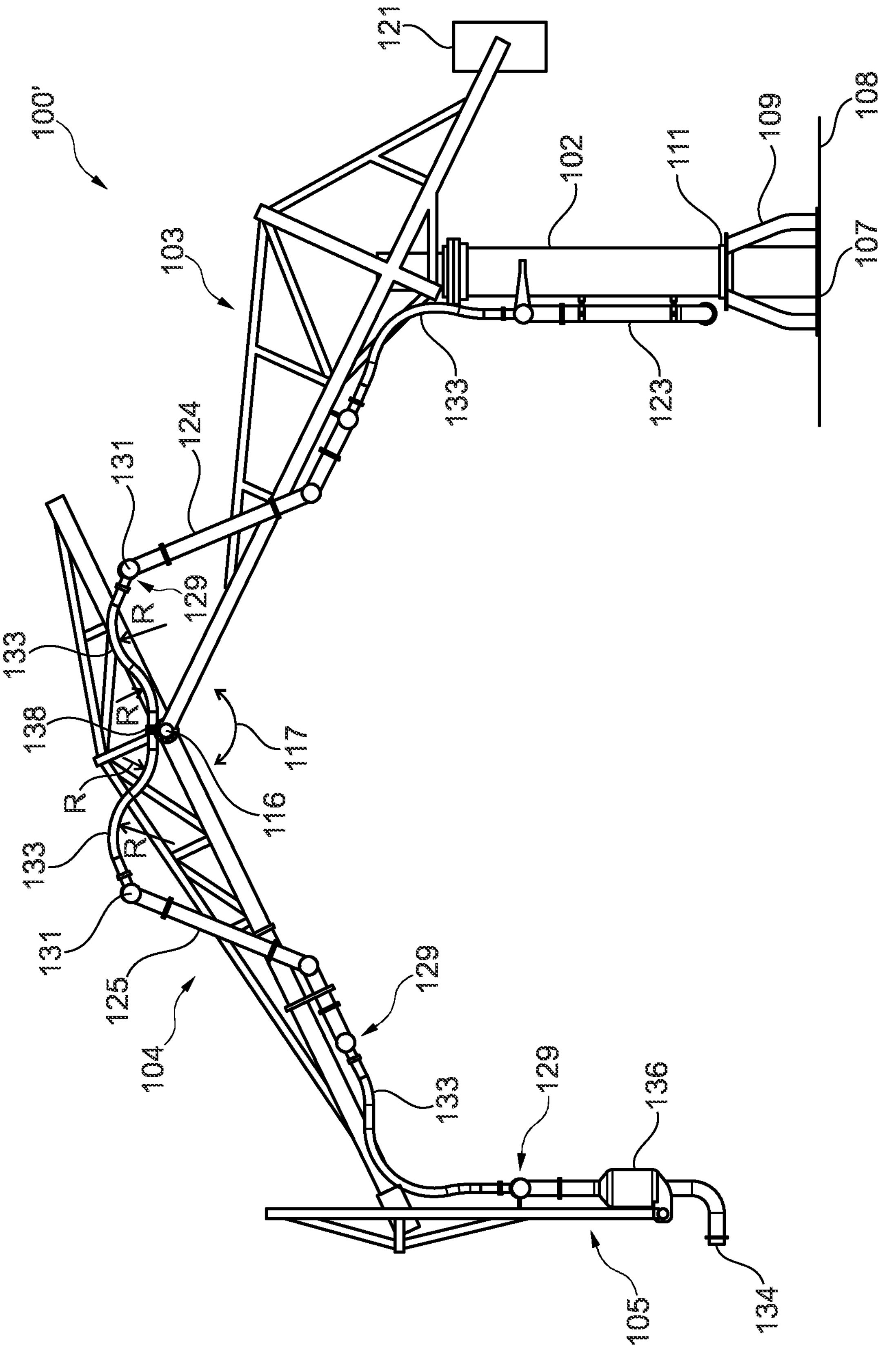
FIG. 3A a second embodiment of a transfer device according to the present disclosure.

FIG. 3A shows an alternative embodiment of the transfer device 100', in which the rigid transfer lines 124, 125 are angled. In this embodiment the loop 137 of the flexible lines 133 is no longer required. Instead a connection component 138 is located next to the second pivot joint 116. Flexible transfer lines 133 connect the distributor-collector-component of the rigid transfer line 124 with the connection component 138. Further flexible transfer lines 133 connect the connection component 138 with the distributor-collector-component of the rigid transfer line 125. The connection component 138 is provided with pipe sockets 139, which are horizontally oriented. The angled structure of the transfer lines 124, 125 and that the horizontal orientation of the pipe sockets 139 permit to keep the bending radii of the flexible lines 133 within acceptable limits. The bending radii of the flexible lines 133 are indicated as R. In FIG. 3A loading sections 103, 104 enclose approximately a 130° angle. But even when the first and second loading arm sections 103, 104 approach or even reach a 180° configuration, minimal bending radii of the flexible transfer lines are not undershot.

Figure 3B:
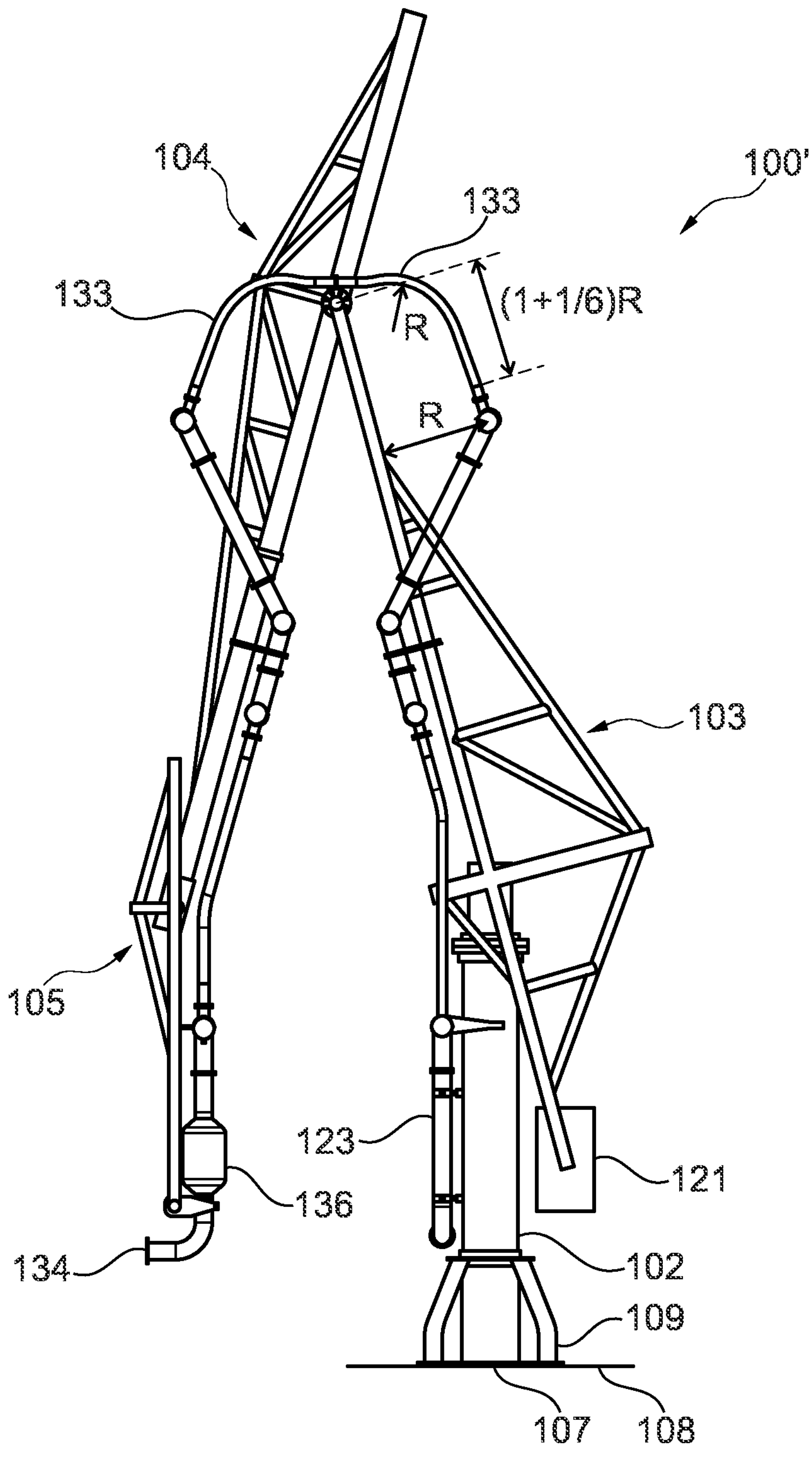
FIG. 3B the transfer device of FIG. 3A in a folded state.

FIG. 3B shows the transfer device 100' when it is in a folded state and illustrates the movement of the flexible lines 133 without exceeding any bending limits. In particular, the angled structure of the rigid transfer lines 124 and 125 lead to a sufficiently large distance between the respective distributor-collector-components 129 resulting in increased bending radii for the flexible transfer lines. The distance between the pipes 132 arranged on the distributor-collector-component 129 of the angled rigid transfer line 124 and the pipe sockets 139 of the connection component 138 is $(1+\frac{1}{6})\times R$, wherein R the bending radios of the flexible line 133.

For the sake of completeness, it is noted that in other embodiments of the transfer device 100 the number of a flexible lines can be smaller or bigger than four but remains to be bigger than 1 to realize the advantages with regard to smaller minimal bending radii and a higher working pressure of the flexible transfer lines.

In a further embodiment, not shown in the drawing, the transfer device comprises an extendable loading device, in which the loading arm sections are mechanically connected and are extendable in their longitudinal direction. In this case, the flexible transfer lines bridge an extension section. In the short state, the flexible transfer line sections are bent and in the long state the flexible transfer line sections are stretched.

In the claims, the word "comprising" does not exclude other elements or steps, and the indefinite article "a" does not exclude a plurality.

A single unit or device may perform the functions of multiple elements recited in the claims. The fact that individual functions and elements are recited in different dependent claims does not mean that a combination of those functions and elements could not advantageously be used.

LIST OF REFERENCE SIGNS

| | |
|---|---|
| 100 | transfer device |
| 101 | support structure |
| 102 | Pillar |
| 103 | first loading arm section |
| 104 | second loading arm section |
| 105 | third loading arm section |
| 106 | Loading arm |
| 107 | base plate |
| 108 | Ground |
| 109 | reinforcement ribs |
| 111 | base bearing |
| 112 | double headed arrow |
| 113 | first pivot joint |

-continued

| | |
|---|---|
| 114 | double headed arrow |
| 116 | second pivot joint |
| 117 | double headed arrow |
| 118 | third pivot joint |
| 119 | double headed arrow |
| 121 | counterweight |
| 122 | transfer line |
| 123-126 | Rigid transfer line sections |
| 128 | Entry flange |
| 129 | Distributor-collector-component |
| 131 | Transversal tube |
| 132 | Pipe socket |
| 133 | Flexible line |
| 134 | Output flange |
| 136 | Emergency release coupling |
| 137 | loop |
| 138 | Connection component |

The invention claimed is:

1. A transfer device for transferring flowable material between a first reservoir and a second reservoir according to a flow direction, wherein the transfer device comprises:

a loading device, including several loading arm sections mechanically connected by at least one pivot joint; and a transfer line connecting the first and second reservoir, wherein the transfer line is composed of rigid and flexible transfer line sections, wherein each of the rigid transfer line sections extend along at least one of the loading arm sections, wherein at least one of the rigid transfer line section has an end, located in vicinity to the at least one pivot joint that branches into several of the flexible transfer sections, which are fluidly merged into an end of the next rigid transfer line in the flow direction so that the flexible transfer line sections connecting said rigid transfer line sections together in vicinity to the at least one pivot joint allow pivotal movements of the loading arm sections around the pivot joint.

2. The transfer device according to claim 1, wherein the rigid transfer line sections form the loading arm sections.

3. The transfer device according to claim 1, wherein the rigid and flexible transfer line sections are vacuum insulated transfer lines.

4. The transfer device according to claim 1, wherein the flexible transfer line sections connect the rigid transfer line sections across the pivot joint connecting the transfer arm sections associated with the rigid transfer line sections.

5. The transfer device according to claim 1, wherein each of the rigid transfer line sections is fluidly connected with a distributor-collector-component that branches the rigid transfer line into the several flexible transfer line sections and/or merges the several flexible transfer line sections.

6. The transfer device according to claim 1, wherein the flexible transfer line sections form a loop.

7. The transfer device according to claim 1, wherein two adjacent rigid transfer line sections associated with two adjacent loading arm sections are angled such that an angled portion of the two adjacent transfer line sections deviates from being parallelly oriented with the associated loading arm sections.

8. The transfer device according to claim 7, wherein the flexible transfer line sections fluidly connecting the angled portions of the two adjacent rigid transfer line sections take an S-shaped form when the loading arm sections associated with the two rigid transfer line sections approach a 180° configuration.

9. The transfer device according to claim 8, wherein radii of curves of the S-shaped flexible transfer lines are bigger than a minimal allowed bending radius of the flexible transfer lines.

10. The transfer device according to claim 7, wherein a connection component is arranged next to the pivot joint connecting the associated loading arm sections, wherein the connection component is horizontally oriented.

11. The transfer device according to claim 10, wherein the axis of the pivot joint passes through the connection component.

12. The transfer device according to claim 10, wherein upstream and downstream flexible transfer lines are connected with the connection component.

13. The transfer device according to claim 1, wherein a vertical portion of a support structure is pivotable in a base bearing.

14. The transfer device according to claim 1, wherein one rigid transfer line section extends along the vertical portion of the support structure and provides a fluid input, wherein the fluid input is connected with a flexible line with the first reservoir.

15. The transfer device according to claim 1, wherein each of the flexible transfer line sections has a diameter smaller than a diameter of the rigid transfer line sections and the flexible transfer line sections have a fee passage area at least as big as a free passage area of the rigid transfer line sections.

* * * * *